United States Patent
Martin et al.

(10) Patent No.: US 12,388,115 B2
(45) Date of Patent: Aug. 12, 2025

(54) ELECTROLYTES WITH LITHIUM DIFLUORO(OXALATO)BORATE AND LITHIUM TETRAFLUOROBORATE SALTS FOR LITHIUM METAL AND ANODE-FREE CELLS

(71) Applicant: Tesla Motors Canada ULC, North York (CA)

(72) Inventors: Cameron Martin, Dartmouth (CA); Sam Hames, Truro (CA); Matthew Genovese, Halifax (CA); Alexander J. Louli, Halifax (CA); Rochelle Weber, Halifax (CA); Jeffery Dahn, Halifax (CA)

(73) Assignee: Tesla, Inc., Austin, TX (US)

( * ) Notice: Subject to any disclaimer, the term of this patent is extended or adjusted under 35 U.S.C. 154(b) by 216 days.

(21) Appl. No.: 16/242,581

(22) Filed: Jan. 8, 2019

(65) Prior Publication Data
US 2020/0220220 A1    Jul. 9, 2020

(51) Int. Cl.
*H01M 10/0568* (2010.01)
*H01M 10/052* (2010.01)
*H01M 10/0569* (2010.01)

(52) U.S. Cl.
CPC ..... *H01M 10/0568* (2013.01); *H01M 10/052* (2013.01); *H01M 10/0569* (2013.01);
(Continued)

(58) Field of Classification Search
None
See application file for complete search history.

(56) References Cited

U.S. PATENT DOCUMENTS 5,599,435 A    2/1997    Li et al.
6,087,036 A *  7/2000    Rouillard .......... H01M 10/0468
                                                    429/66
(Continued)

FOREIGN PATENT DOCUMENTS

CN    104934638    9/2015
JP    H07-223819    8/1995
(Continued)

OTHER PUBLICATIONS

Zhang, L., Sun, Y., Zhou, Y. et al. Investigation of the synergetic effects of LiBF4 and LiODFB as wide-temperature electrolyte salts in lithium-ion batteries. Ionics 24, 2995-3004 (2018). https://doi.org/10.1007/s11581-018-2470-1 (Year: 2018).*

(Continued)

*Primary Examiner* — Maria Laios
(74) *Attorney, Agent, or Firm* — Knobbe, Martens, Olson & Bear, LLP

(57) ABSTRACT

Provided are electrolyte solutions including both lithium difluoro(oxalato)borate and lithium tetrafluoroborate and a solvent component for use in lithium metal or anode-free rechargeable battery cell and methods of using the electrolyte solutions to improve capacity retention of the battery cells. Also provided are rechargeable battery systems including a lithium metal or anode-free battery cell and electrolyte solutions including both lithium difluoro(oxalato)borate and lithium tetrafluoroborate and a solvent component. The systems described herein exhibit improved capacity retention.

28 Claims, 9 Drawing Sheets

(52) U.S. Cl.
CPC .............. *H01M 2300/0034* (2013.01); *H01M 2300/0037* (2013.01)

(56) References Cited

U.S. PATENT DOCUMENTS

| | | | |
|---|---|---|---|
| 9,620,809 B2 | 4/2017 | Teixidor et al. | |
| 2008/0063946 A1* | 3/2008 | Kubota | H01M 10/052 429/331 |
| 2011/0091768 A1* | 4/2011 | Ohashi | H01M 10/052 429/199 |
| 2012/0219866 A1* | 8/2012 | Onuki | H01M 10/056 429/200 |
| 2012/0276445 A1* | 11/2012 | Xu | H01M 10/0568 429/188 |
| 2016/0240896 A1* | 8/2016 | Zhang | H01M 10/0568 |

FOREIGN PATENT DOCUMENTS

| | | | | |
|---|---|---|---|---|
| JP | 2011-071098 | 4/2011 | | |
| JP | 2016-515291 | 5/2016 | | |
| JP | 2018-060689 | 4/2018 | | |
| JP | 2018-133146 | 8/2018 | | |
| JP | 2018-170238 | 11/2018 | | |
| JP | 2019-140115 | 8/2019 | | |
| JP | 2021-506090 | 2/2021 | | |
| KR | 10-2020-0057612 | 5/2010 | | |
| KR | 20140139792 | * 12/2014 | ............ | Y02E 60/10 |
| KR | 1020140139792 | 12/2014 | | |
| KR | 1020150083363 | 7/2015 | | |
| KR | 1020180138456 | 12/2018 | | |
| KR | 1020180138546 | 12/2018 | | |

OTHER PUBLICATIONS

Hongming Zhou, Kaiwen Xiao, Jian Li, Lithium difluoro(oxalate)borate and LiBF4 blend salts electrolyte for LiNi0.5Mn1.5O4 cathode material,Journal of Power Sources, vol. 302, 2016, pp. 274-282, ISSN 0378-7753, https://doi.org/10.1016/j.jpowsour.2015.10.073. (Year: 2016).*

CN104934638—machine translation (Year: 2015).*

Jurng S., et al. "Effect of electrolyte on the nanostructure of the solid electrolyte interphase (SEI) and performance of lithium metal anodes", Energy and Environmental Science 2018;11(9):2600-2608.

Weber et al., Jul. 15, 2019, Long cycle life and dendrite-free lithium morphology in anode-free lithium pouch cells enabled by a dual-salt liquid electrolyte, Nature Energy, 4(8):683-689.

International Search Report and Written Opinion dated Apr. 3, 2020 in patent application No. PCT/US2020/012593.

* cited by examiner

ELECTROLYTES WITH LITHIUM DIFLUORO(OXALATO)BORATE AND LITHIUM TETRAFLUOROBORATE SALTS FOR LITHIUM METAL AND ANODE-FREE CELLS

TECHNICAL FIELD

The present disclosure relates to rechargeable battery systems, and more specifically to the methods of improving capacity retention in lithium metal and anode-free lithium batteries and electrolyte solutions for use in such battery systems.

BACKGROUND

Rechargeable batteries are an integral component of energy-storage systems for electric vehicles and for grid storage (for example, for backup power during a power outage, as part of a microgrid and so forth). Some such rechargeable battery systems include lithium metal and anode-free lithium batteries. Lithium metal and anode-free lithium batteries have certain advantages over traditional lithium ion batteries, as they are more energy dense. Anode-free cells are also less expensive and easier to assemble due to their lack of anode coating. However, challenges with lithium metal and anode-free lithium batteries have prevented their wide spread adoption. Improving certain characteristics of lithium metal and anode-free battery systems will allow for more widespread use of such systems. For instance, developing electrolyte compositions that allow for commercially acceptable cycling performance of lithium metal and anode-free lithium batteries is critical to gaining adoption of such battery systems. Until the present disclosure, the general consensus in the industry is that an electrolyte with lithium difluoro(oxalato)borate ("LiDFOB") salt alone best increases the capacity retention of lithium metal and anode-free lithium cells. See Jurng S, Brown Z L, Kim J, Lucht B L. Effect of electrolyte on the nanostructure of the solid electrolyte interphase (SEI) and performance of lithium metal anodes. Energy and Environmental Science 2018; 11(9):2600-2608.

Definitions

"Cell" or "battery cell" generally refers to an electrochemical cell, which is a device capable of generating electrical energy from chemical reactions or facilitating chemical reactions through the introduction of electrical energy. A battery can contain one or more cells.

"Rechargeable battery" generally refers a type of electrical battery which can be charged, discharged into a load, and recharged a number of times. In this disclosure, a number of examples are described based on anode-free lithium ion batteries. Nevertheless, embodiments of the present invention are not limited to one type of anode-free rechargeable battery, and can be applied in conjunction with various lithium metal or anode-free rechargeable battery technologies.

SUMMARY

This disclosure covers methods of improving capacity retention in anode-free lithium battery systems and electrolyte solutions for use in such battery systems. The present method and electrolyte solutions have been found to surprisingly provide for increased capacity retention of anode-free battery systems. More specifically, this disclosure describes that a combination of LiDFOB and lithium tetrafluoroborate ("LiBF$_4$") as a dual salt for electrolytes in anode-free cells improves capacity retention during charge-discharge cycling. This dual salt electrolyte solution has been found to be surprisingly better than electrolytes with LiDFOB alone or LiBF$_4$ alone. Additionally, the morphology of plated lithium has been shown by scanning electron microscopy to be much improved when the dual salt is used compared to that obtained when conventional electrolytes are used. Further, both the charge-discharge capacity retention and the plated lithium morphology are further improved when pouch-type anode-free cells using the dual salt electrolyte are subjected to uniaxial stack pressure in the range between 20 and 500 pounds per square inch.

Provided herein is a method of improving capacity retention in a lithium metal or anode-free rechargeable battery cell. The method includes providing to the battery cell a salt component including both lithium difluoro(oxalato)borate and lithium tetrafluoroborate and a solvent component. In an embodiment, the solvent component includes fluorethylene carbonate. In further embodiments, an uniaxial stack pressure in the range of 20 to 500 pounds per square inch is applied to the battery cell. In an embodiment, the solvent component includes fluorethylene carbonate. In further embodiments, the solvent component further includes diethyl carbonate. In some embodiments, the ratio of fluorethylene carbonate to diethyl carbonate is between about 0.5:3 to about 3:0.5 by volume. In further embodiments, the molar concentration of lithium difluoro(oxalato)borate is between about 0.5M and 2M and the molar concentration of lithium tetrafluoroborate is between about 0.5M and about 2M. In certain embodiments provided herein, the capacity retention of the system is improved by at least 50% compared to a system using only one of lithium difluoro(oxalato) borate or lithium tetrafluoroborate. In further embodiments, the capacity retention of the system is maintained to at least 85% over 50 cycles at a charge rate of C/5 and discharge rate of C/2 at 40° C. In other embodiments, the capacity retention of the system is maintained to at least 80% over 50 cycles at a charge rate of C/5 and discharge rate of C/2 at 20° C. under uniaxial stack pressure of at least 150 psi.

Also provided herein is a rechargeable battery system including a lithium metal or anode-free battery cell and a salt component including both lithium difluoro(oxalato)borate and lithium tetrafluoroborate and a solvent component. In an embodiment, the solvent component includes fluorethylene carbonate. In further embodiments, the solvent component further includes diethyl carbonate. In some embodiments, the ratio of fluorethylene carbonate to diethyl carbonate is between about 0.5:3 to about 3:0.5 by volume. In certain embodiments provided herein, the capacity retention of the system is improved by at least 50% compared to a system using only one of lithium difluoro(oxalato)borate and lithium tetrafluoroborate. In other embodiments, the capacity retention of the system is maintained to at least 80% over 50 cycles at a charge rate of C/5 and discharge rate of C/2 at 20° C. under uniaxial stack pressure of at least 150 psi. In further embodiments, the system is subjected to an uniaxial stack pressure of about 20 to about 500 psi.

Also provided herein is an electrolyte composition comprising a salt component including both lithium difluoro(oxalato)borate and lithium tetrafluoroborate and a solvent component. In some embodiments, the solvent component includes fluorethylene carbonate. In further embodiments, the solvent component further includes diethyl carbonate. In some embodiments, the ratio of fluorethylene carbonate to diethyl carbonate is between about 0.5:3 to about 3:0.5.

BRIEF DESCRIPTION OF THE DRAWINGS

FIG. 9 shows the significant impact of applied pressure on cells tested at 20° C. using 0.6M LiDFOB+0.6 M LiBF$_4$ in FEC:DEC 1:2.

DETAILED DESCRIPTION OF THE DISCLOSURE

Figure 1:
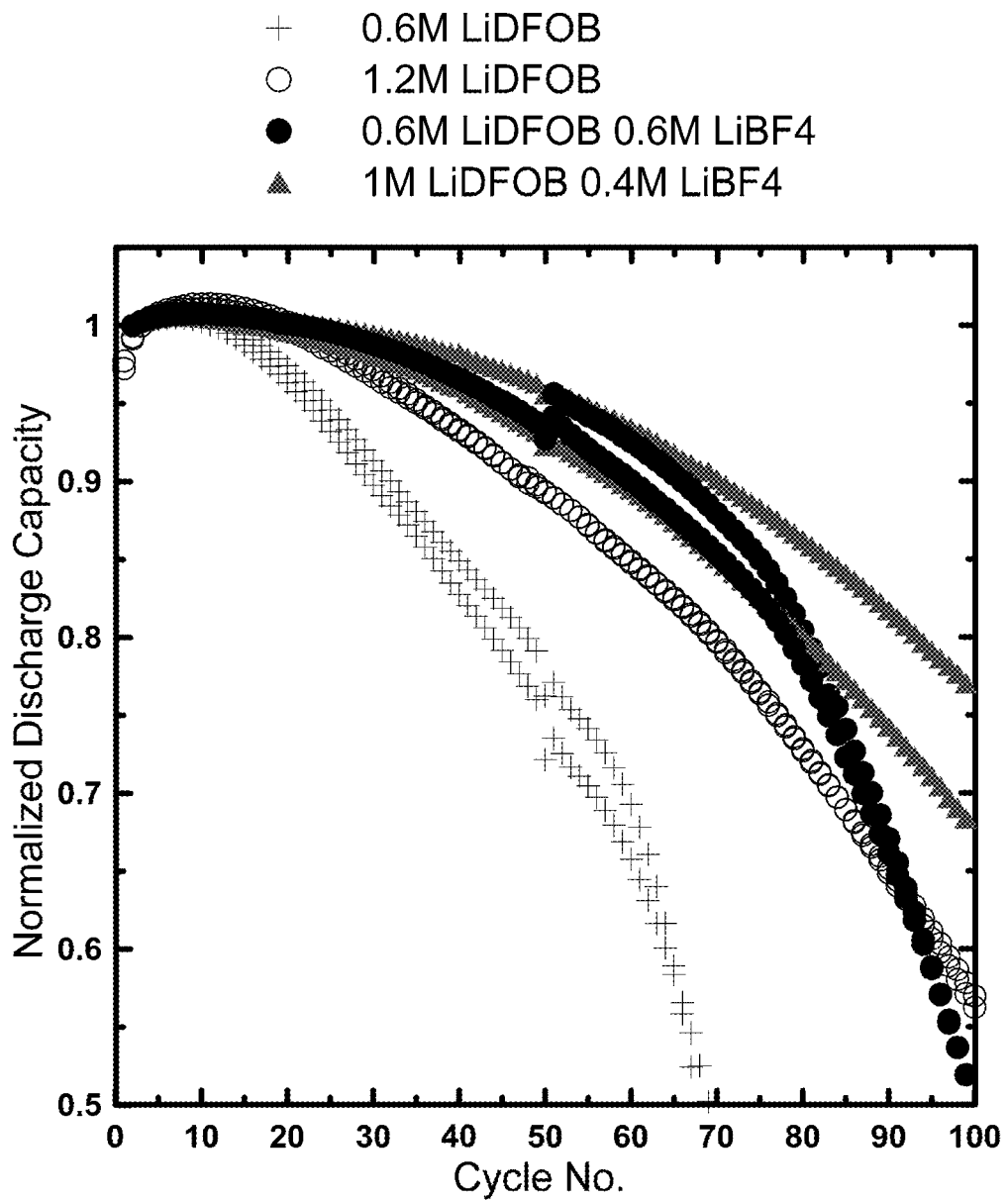
FIG. 1 illustrates experimental data collected during charge-discharge cycling experiments in anode-free pouch-type cells at a charge rate of C/5 and discharge rate of C/2 at a cell stack pressure of about 10 psi, at 40° C., and between voltage limits of 3.6V and 4.5V for: 1) 0.6M LiDFOB; 2) 0.6M LiDFOB+0.6M LiBF$_4$; 3) 1.2M LiDFOB; and 4) 1M LiDFOB+0.4M LiBF$_4$.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

In an embodiment, provided is an electrolyte composition comprising a salt component including both lithium difluoro(oxalato)borate and lithium tetrafluoroborate and a solvent component. In further embodiments, the solvent includes fluorethylene carbonate. Also provided is a rechargeable battery system having a battery cell that contains a salt component including both lithium difluoro(oxalato)borate and lithium tetrafluoroborate and a solvent component. In further embodiments, the solvent includes fluorethylene carbonate. In some embodiments, the rechargeable battery system includes an anode-free cell. In other embodiments, the rechargeable battery system includes lithium metal anodes.

In further embodiments a method of improving capacity retention in a rechargeable battery cell is provided. The method includes providing to the battery cell a salt component including both lithium difluoro(oxalato)borate and lithium tetrafluoroborate and a solvent component.

In further embodiments the rechargeable battery system with the inventive electrolyte is subjected to uniaxial stack pressure to improve the morphology of the plated lithium and improve capacity retention. In certain embodiments, uniaxial stack pressure ranges from 10 psi to 500 psi. In further embodiments, subjecting the rechargeable battery system to uniaxial stack pressure significantly improves retention. In yet further embodiments, subjecting the rechargeable battery system to uniaxial stack pressure significantly improves capacity retention, particularly at lower temperatures, e.g. 20° C. For example, in some embodiments, subjecting the rechargeable battery system to higher uniaxial stack pressure (e.g. 170 psi) results in capacity retention of at least 80%, at 20° C. and 50 cycles. In some embodiments, the uniaxial stack pressure is at least 50 psi, 60 psi, 70 psi, 80 psi, 90 psi, 100 psi, 110 psi, 120 psi, 130 psi, 140 psi, 150 psi, 160 psi, 170 psi, 180 psi, 190 psi, 200 psi, 210 psi, 220 psi, 230 psi, 240 psi, 250 psi, 260 psi, 270 psi, 280 psi, 290 psi, 300 psi, 310 psi, 320 psi, 330 psi, 340 psi, 350 psi, 360 psi, 370 psi, 380 psi, 390 psi, 400 psi, 410 psi, 420 psi, 430 psi, 440 psi, 450 psi, 460 psi, 470 psi, 480 psi, 490 psi, or 500 psi. In further embodiments, the capacity retention of the system is at least 70%, 75%, 80%, 85%, or 90%.

In further embodiments, the solvent component includes fluorethylene carbonate. According to some embodiments described herein, the solvent component includes both fluorethylene carbonate and an additional solvent. In certain embodiments the additional solvent is a carbonate solvent. In yet further embodiments, the carbonate solvent includes diethyl carbonate, dimethyl carbonate, ethyl methyl carbonate, methyl propyl carbonate, propylene carbonate, and combinations thereof. In further embodiments, wherein fluorethylene carbonate is present with an additional carbonate solvent, the ratio by volume of fluorethylene carbonate to the additional carbonate solvent ranges from about 0.5:3 to about 3:0.5. In certain embodiments, the ratio by volume of fluorethylene carbonate to the additional carbonate solvent is about 0.5:3, 0.75:3; 1:3; 1.5:3, 2:3, 2.5:3, 1:1, 1:2, 1:3, 3:0.5, 3:0.75, 3:1, 3:1.5, 3:2, 3:2.5,or 2:1.

In further embodiments, the molar concentration of lithium difluoro(oxalato) in the salt component is between about 0.5M and 2.0M. In some embodiments, the molar concentration of lithium difluoro(oxalato) in the salt component is about 0.5M, 0.6M, 0.7M, 0.8M, 0.9M, 1.0M, 1.1M, 1.2M, 1.3M, 1.4M, 1.5M, 1.6M, 1.7M, 1.8M, 1.9M, 2.0M, or 2.1M.

In yet further embodiments, the molar concentration of lithium tetrafluoroborate is between about 0.5M and about 2.0M. In further embodiments, the molar concentration of lithium tetrafluoroborate in the salt component is about 0.5M, 0.6M, 0.7M, 0.8M, 0.9M, 1.0M, 1.1M, 1.2M, 1.3M, 1.4M, 1.5M, 1.6M, 1.7M, 1.8M, 1.9M, 2.0M, 2.1M, 2.2M, 2.3M, 2.4M, 2.5M, 2.6M, 2.7M, 2.8M, 2.9M, 3.0M, 3.1M, 3.2M, 3.3M, 3.4M, 3.5M, 3.6M, 3.7M, 3.8M, 3.9M, 4.0M, 4.1M, 4.2M, 4.3M, 4.4M, 4.5M, 4.6M, 4.7M, 4.8M, 4.9M, or 5.0M.

According to certain methods described herein, the capacity retention of the battery systems described herein are improved by at least 50% compared to a lithium metal free or anode-free battery system using only one of lithium difluoro(oxalato)borate and lithium tetrafluoroborate. In further embodiments, the capacity retention is improved by at least 55%, 60%, 65%, 70%, or 75% compared to a lithium metal free or an anode-free battery system using only one of lithium difluoro(oxalato)borate and lithium tetrafluoroborate.

In further embodiments, the capacity retention of the battery system is maintained by at least 85% over 50 cycles at a charge rate of C/5 and discharge rate of C/2. In yet further embodiments, the capacity retention is at least 86%, 87%, 88%, 89%, 90%, 91%, 92%, 93%, 94%, 95%, 96%, or 97%.

In further embodiments, the battery systems described herein include any known lithium metal or anode-free lithium battery systems.

Experiments

Dry and sealed single crystal Li[Ni$_{0.5}$Mn$_{0.3}$Co$_{0.2}$]O$_2$ (NMC 532)∥ Cu pouch cells (260 mAh at 4.5 V) were obtained from Li-FUN Technology (Xinma Industry Zone, Golden Dragon Road, Tianyuan District, Zhuzhou City, Hunan Province, China, 412000). The positive electrode consisted of 94 wt. % active material and the single side coating active material electrode loading was 16 mg/cm$^2$. The positive electrode was compressed to a density of 3.5 g/cm3. Reagents used for electrolytes included FEC (BASF, purity 99.4%), DEC (BASF, purity>99%), DMC (BASF, purity>99%), LiPF$_6$ (BASF, purity 99.9%), LiDFOB (Capchem or 3M), and LiBF$_4$ (Capchem), Electrolyte components were mixed in an argon filled glovebox using a precision balance. Prior to filing with the desired electrolyte, pouch cells were cut open and dried at 100° C. under vacuum for 14 h to remove any residual moisture. Afterwards, pouch cells were filled with 0.5 mL electrolyte in an argon filled glove box and sealed with a pouch sealer (MSK-115A Vacuum Sealing Machine) under vacuum at a pressure of −90 kPa (relative to atmospheric pressure). After filling, cells were held at 1.5 V for 24 h to promote wetting and subsequently moved to a 40° C. temperature box for cycling.

Salt compositions and solvent compositions were tested for their abilities to improve capacity retention in these pouch cells.

Salt Compositions

As shown in FIG. 1, this surprising result described herein was observed in charge-discharge cycling experiments that were conducted using the anode-free pouch cells using: 1) 0.6M LiDFOB; 2) 0.6M LiDFOB+0.6M LiBF$_4$; 3) 1.2M LiDFOB; and 4) 1M LiDFOB+0.4M LiBF$_4$. In this first series of experiments, the testing was conducted at a cell stack pressure of about 10 psi, at 40° C., and between voltage limits of 3.6V and 4.5V. The solvent employed was a FEC:DEC 1:2 volume ratio solvent. Duplicate data points correspond to data for two nominally identical cells. FIG. 1 illustrates that the capacity retention is improved when LiDFOB is used in combination with LiBF$_4$.

Figure 2:
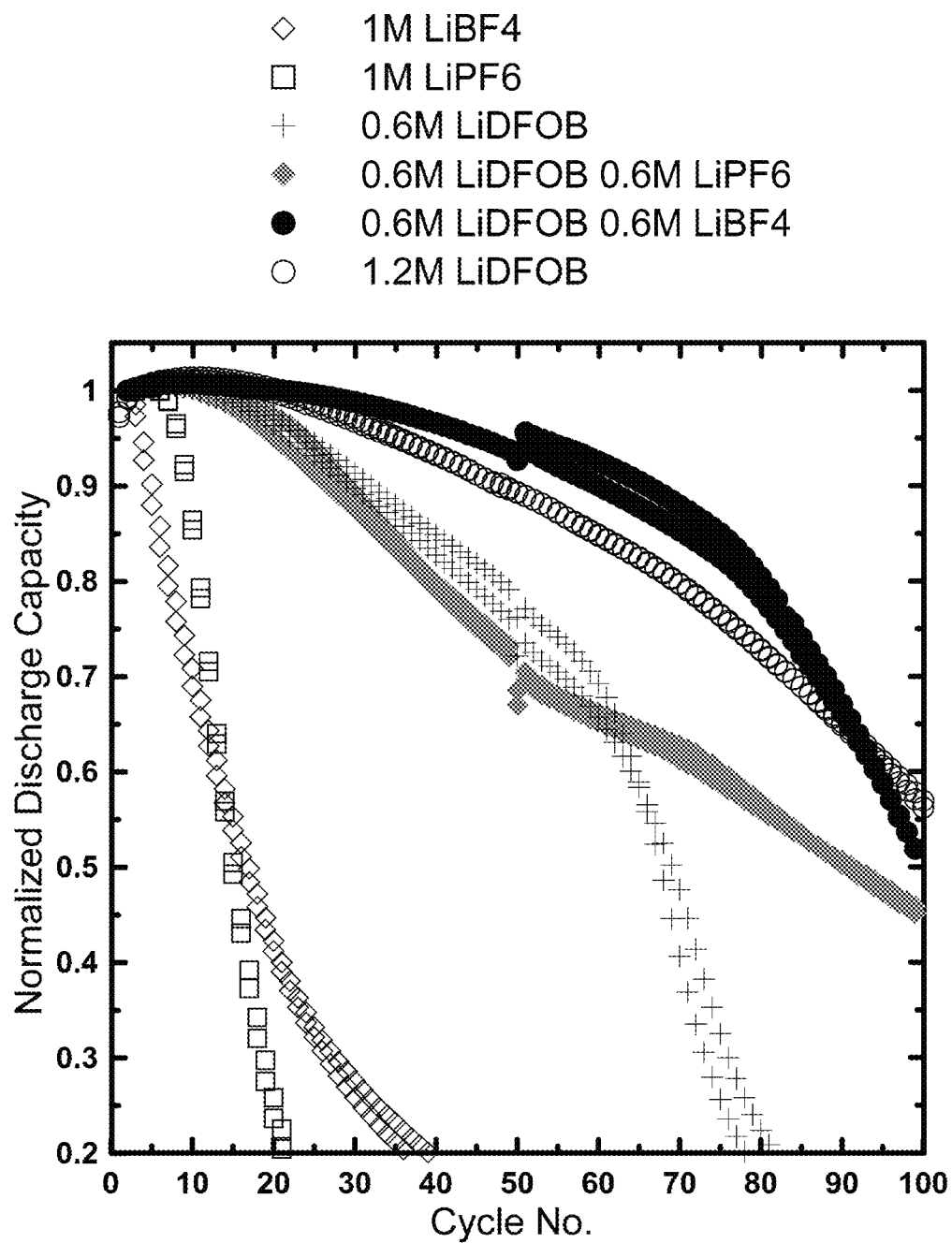
FIG. 2 illustrates experimental data collected during charge-discharge cycling experiments in anode-free pouch-type cells at a charge rate of C/5 and discharge rate of C/2 at a cell stack pressure of about 10 psi, at 40° C., and between voltage limits of 3.6V and 4.5V for: 1) 1M LiBF$_4$; 2) 1M LiPF$_6$; 3) 0.6M LiDFOB; 4) 0.6M LiDFOB+0.6M LiPF$_6$; 5) 0.6M LiDFOB+0.6M LiBF$_4$; and 6) 1.2M LiDFOB.

Additional testing confirmed the surprising results demonstrated in FIG. 1. Additional cycling experiments were conducted in anode-free cells at a charge rate of C/5 and discharge rate of C/2 for: 1) 1M LiBF$_4$; 2) 1M LiPF$_6$; 3) 0.6M LiDFOB; 4) 0.6M LiDFOB+0.6M LiPF$_6$; 5) 0.6M LiDFOB+0.6M LiBF$_4$; and 6) 1.2M LiDFOB. The testing was conducted at a cell stack pressure of about 10 psi, at 40° C., and between voltage limits of 3.6V and 4.5V. The solvent employed was a FEC:DEC 1:2 volume ratio solvent. Duplicate data points correspond to data for two nominally identical cells. FIG. 2 illustrates that the capacity retention is improved when LiDFOB is used in combination with LiBF$_4$. Additionally, FIG. 2 illustrates that LiDFOB and LiPF$_6$ in combination show enhanced capacity retention, although to a lesser extent than when LiDFOB is used in combination with LiBF$_4$. This data suggests that a combination of LiDFOB+LiBF$_4$+LiPF$_6$ may also show favorable enhanced capacity retention in anode-free cells.

Upper Cutoff Voltage Testing

Figure 3:
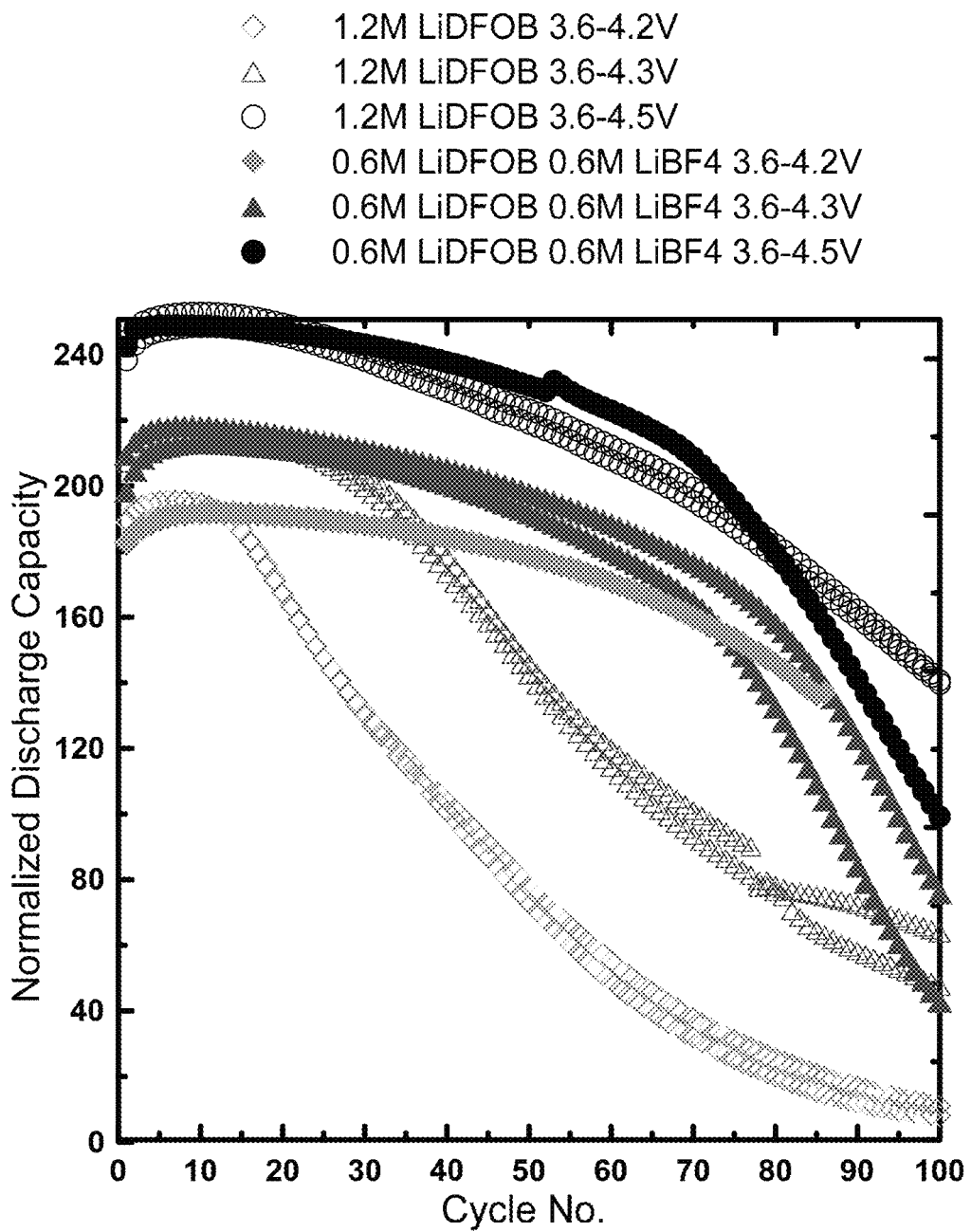
FIG. 3 illustrates experimental data collected during charge-discharge cycling experiments in anode-free pouch-type cells at a charge rate of C/5 and discharge rate of C/2 for at a cell stack pressure of about 10 psi, and at 40° C.: 1) 1.2M LiDFOB between voltage limits of 3.6V and 4.2V; 2) 1.2M LiDFOB between voltage limits of 3.6V and 4.3V; 3) 1.2M LiDFOB between voltage limits of 3.6V and 4.5V; 4) 0.6M LiDFOB+0.6M LiBF$_4$ between voltage limits of 3.6V and 4.2V; 5) 0.6M LiDFOB+0.6M LiBF$_4$ between voltage limits of 3.6V and 4.3V; and 6) 0.6M LiDFOB+0.6M LiBF$_4$ between voltage limits of 3.6V and 4.5V.

Testing to various upper cutoff voltages was also conducted on the salt compositions to determine if the surprising results observed with enhanced capacity retention using LiDFOB+LiBF4 were consistent across various voltages. FIG. 3 shows experimental data collected during charge-discharge cycling experiments in anode-free cells at a charge rate of C/5 and discharge rate of C/2 for: 1) 1.2M LiDFOB between voltage limits of 3.6V and 4.2V; 2) 1.2M LiDFOB between voltage limits of 3.6V and 4.3V; 3) 1.2M LiDFOB between voltage limits of 3.6V and 4.5V; 4) 0.6M LiDFOB+ 0.6M LiBF$_4$ between voltage limits of 3.6V and 4.2V; 5)

0.6M LiDFOB+0.6M LiBF$_4$ between voltage limits of 3.6V and 4.3V; and 6) 0.6M LiDFOB+0.6M LiBF$_4$ between voltage limits of 3.6V and 4.5V. The testing was conducted at a cell stack pressure of about 10 psi, and at 40° C. Duplicate data points correspond to data for two nominally identical cells. The solvent employed was a FEC:DEC 1:2 volume ratio solvent. As shown in FIG. 3, for different upper cycling voltages (4.2 V, 4.3 V, and 4.5 V), adding LiBF$_4$ improves capacity retention over LiDFOB alone. This confirmed that LiDFOB+LiBF$_4$ consistently improved capacity retention with varied cycling voltage, while LiDFOB alone performs worse at the lower voltages.

Solvent Compositions

Solvent compositions were also tested to determine the impact of solvent on the ability of LiDFOB+LiBF$_4$ to improve capacity retention in anode-free cells.

Figure 4:
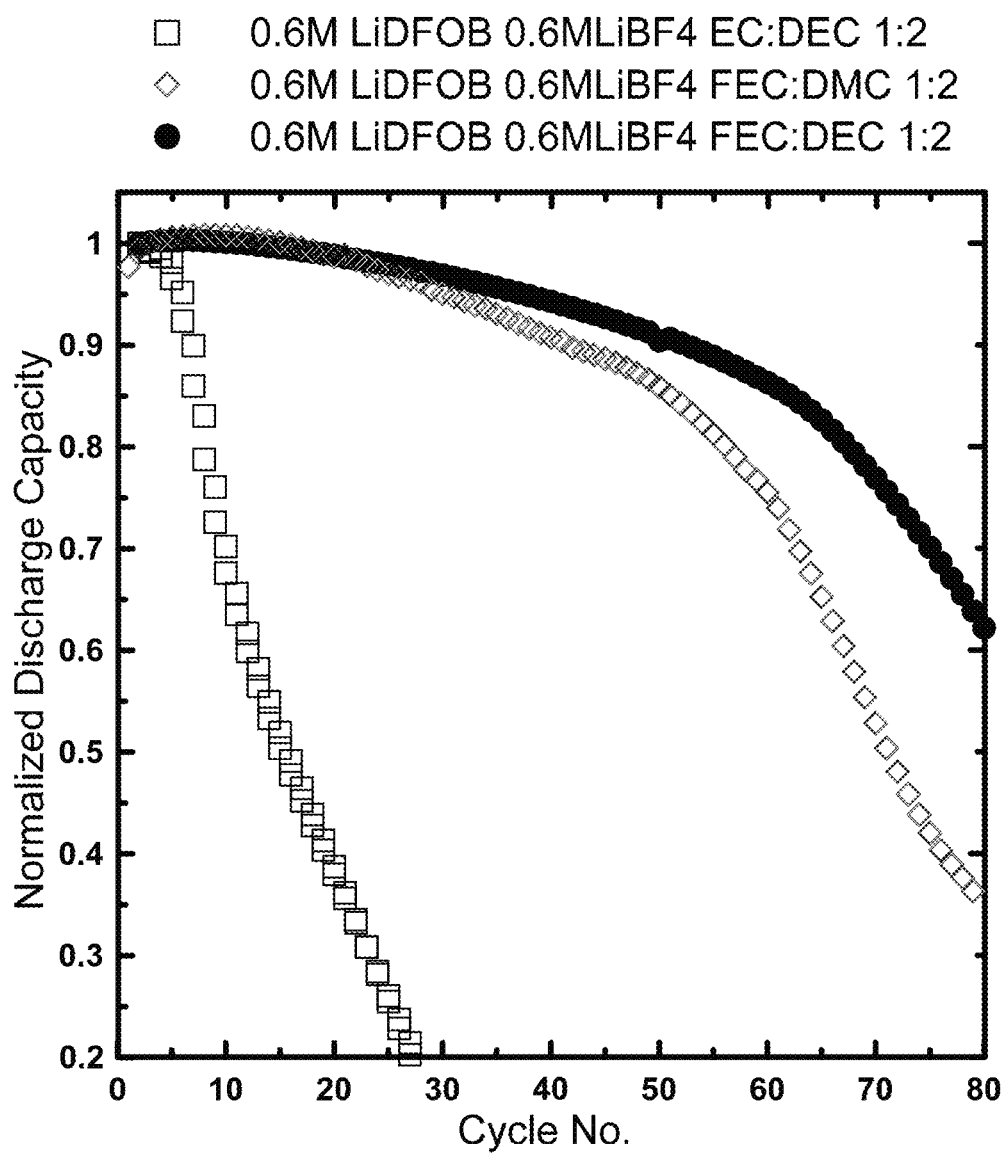
FIG. 4 illustrates experimental data collected during charge-discharge cycling experiments in anode-free pouch-type cells at a charge rate of C/5 and discharge rate of C/2 at a cell stack pressure of about 10 psi, at 40° C. for 1) 0.6 M LiDFOB+0.6M LiBF$_4$ with ethylene carbonate ("EC"):DEC solvent in a 1:2 volume ratio; 2) 0.6 M LiDFOB+0.6M LiBF$_4$ with FEC:dimethylcarbonate ("DMC") solvent in a 1:2 volume ratio; and 3) 0.6 M LiDFOB+0.6M LiBF$_4$ with FEC:DEC solvent in a 1:2 volume ratio.

As shown in FIG. 4, experimental data were collected during charge-discharge cycling experiments in anode-free cells at a charge rate of C/5 and discharge rate of C/2 for: 1) 0.6 M LiDFOB+0.6M LiBF$_4$ with EC:DEC solvent in a 1:2 volume ratio; 2) 0.6 M LiDFOB+0.6M LiBF$_4$ with FEC:DMC solvent in a 1:2 volume ratio; and 3) 0.6 M LiDFOB+0.6M LiBF$_4$ with FEC:DEC solvent in a 1:2 volume ratio. The testing was conducted at a cell stack pressure of about 10 psi, at 40° C., and between voltage limits of 3.6V and 4.5V. Duplicate data points correspond to data for two nominally identical cells. FIG. 4 illustrates that using FEC as a solvent in the electrolyte systems described herein improves capacity retention, particularly when used with other carbonate compounds. FIG. 4 further illustrates that the use of DEC as a cosolvent with FEC shows the most increased capacity retention.

Figure 5:
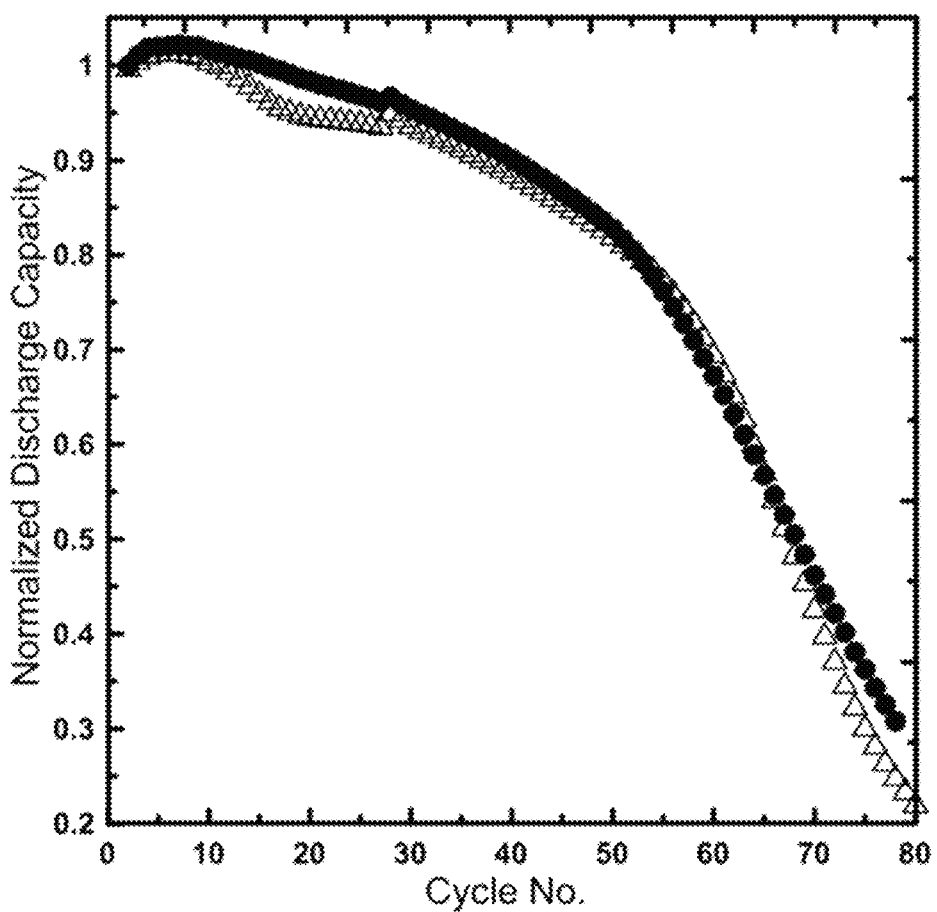
FIG. 5 illustrates experimental data collected during charge-discharge cycling experiments in anode-free pouch-type cells at a charge rate of C/5 and discharge rate of C/2 at a cell stack pressure of about 10 psi, at 40° C. for: 1) 0.6 M LiDFOB+0.6M LiBF$_4$ with FEC:DMC solvent in a 1:1 volume ratio; and 2) 0.6 M LiDFOB+0.6M LiBF$_4$ with FEC:DMC solvent in a 1:2 volume ratio.

Additional experiments were conducted to further explore the solvent composition impact on enhanced capacity retention in anode-free cells. FIG. 5 illustrates experimental data collected during charge-discharge cycling experiments in anode-free cells at a charge rate of C/5 and discharge rate of C/2 for: 1) 0.6 M LiDFOB+0.6M LiBF$_4$ with FEC:DMC solvent in a 1:1 volume ratio; and 2) 0.6 M LiDFOB+0.6M LiBF$_4$ with FEC:DMC solvent in a 1:2 volume ratio. The testing was conducted at a cell stack pressure of about 10 psi, at 40° C., and between voltage limits of 3.6V and 4.5V. FIG. 5 further illustrates that changing the ratio of FEC:DMC does not affect capacity retention in a significant manner.

Figure 6:
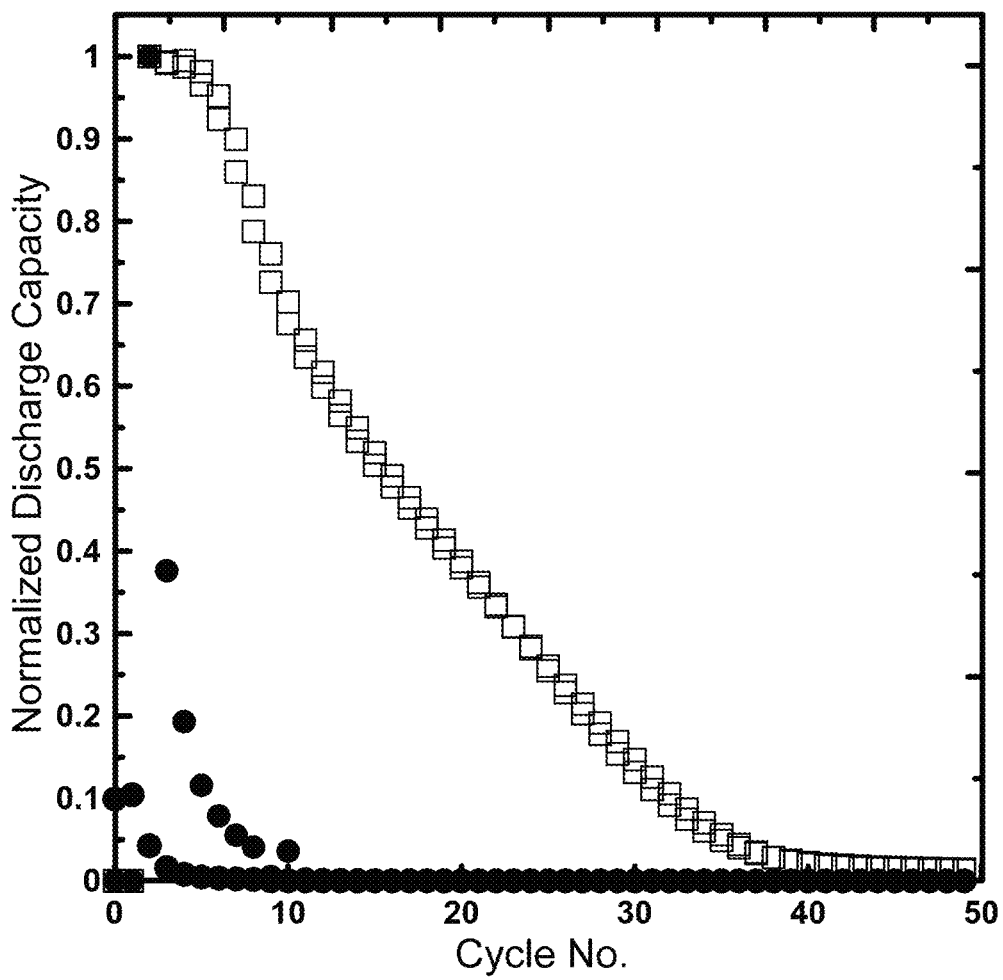
FIG. 6 illustrates experimental data collected during charge-discharge cycling experiments in anode-free pouch-type cells at a charge rate of C/5 and discharge rate of C/2 and at a cell stack pressure of about 10 psi, at 40° C. for: 1) 1M LiPF$_6$ with EC:DEC solvent in a 1:2 volume ratio; and 2) 0.6M LiDFOB and 0.6M LiBF$_4$ in EC:DEC solvent in a 1:2 volume ratio.

Additional experiments were conducted to assess the LiDFOB and LiBF$_4$ combination in other solvents, as well. FIG. 6 illustrates experimental data collected during charge-discharge cycling experiments in anode-free cells at a charge rate of C/5 and discharge rate of C/2 for: 1) 1M LiPF$_6$ with EC:DEC solvent in a 1:2 volume ratio; and 2) 0.6M LiDFOB and 0.6M LiBF$_4$ in EC:DEC solvent in a 1:2 volume ratio. The testing was conducted at a cell stack pressure of about 10 psi, at 40° C., and between voltage limits of 3.6V and 4.5V. FIG. 6 further illustrates that the combination of LiDFOB and LiBF$_4$ improves capacity retention in other solvent mixtures, as well.

Scanning Electron Microscope Assessments

Figure 7:
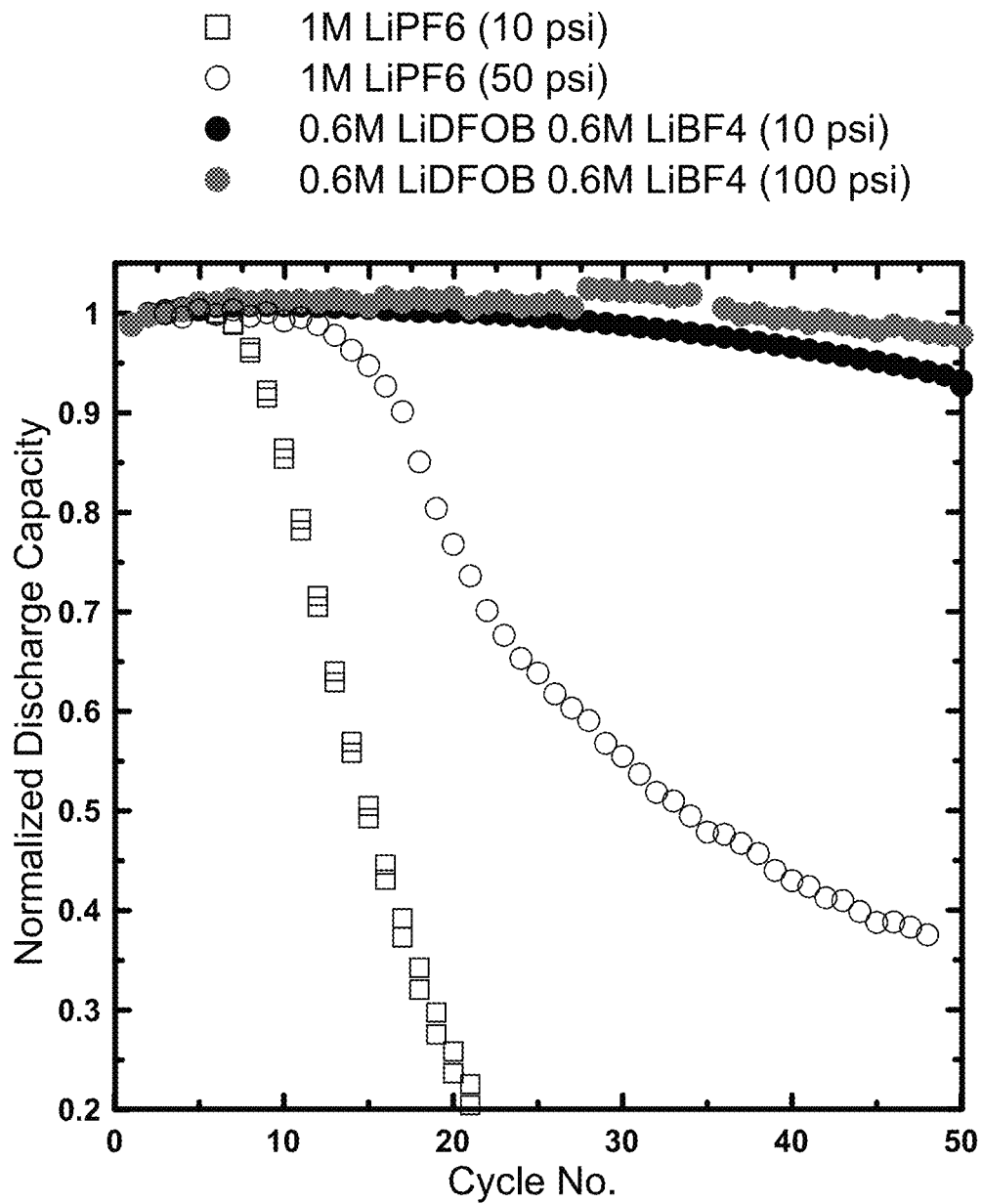
FIG. 7 illustrates experimental data collected during charge-discharge cycling experiments in anode-free pouch type cells at a charge rate of C/5 and discharge rate of C/2 at 40° C. correlating to the SEM images as shown in FIG. 8 for: 1) 1M LiPF$_6$ at a cell stack pressure of about 10 psi; 2) 1M LiPF$_6$ at a cell stack pressure of about 50 psi; 3) 0.6M LiDFOB+0.6M LiBF$_4$ at a cell stack pressure of about 10 psi; and 4) 0.6M LiDFOB+0.6M LiBF$_4$ at a cell stack pressure of about 100 psi.
Figure 8:
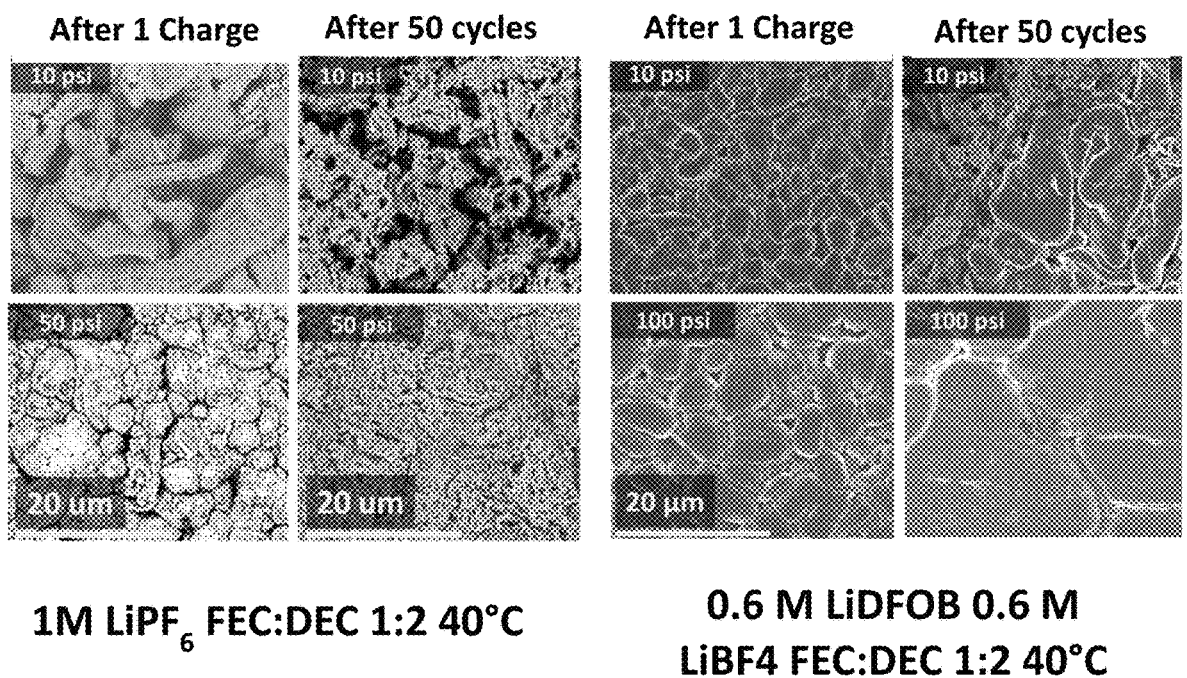
FIG. 8 shows SEM images, taken with a Phenom G2-Pro desktop SEM, of the resulting products from experiments, of the plated lithium with a 20 μm scale bar indicated for: 1) 1M LiPF$_6$ in FEC:DEC at a 1:2 volume ratio at a cell stack pressure of about 10 psi and about 50 psi, at 40° C., and between voltage limits of 3.6V and 4.5V after both 1 charge and after 50 cycles; and 2) 0.6M LiDFOB and 0.6 M LiBF$_4$ in FEC:DEC at a 1:2 volume ratio at a cell stack pressure of about 10 psi and 100 psi, at 40° C., and between voltage limits of 3.6V and 4.5V after both 1 charge and after 50 cycles. Notice that the lithium plated from the electrolyte with LiDFOB plus LiBF$_4$ has extremely small surface area. Notice that the lithium plated from the electrolyte with LiDFOB plus LiBF$_4$ in the cell subjected to 100 psi stack pressure has even smaller surface area.

FIG. 7 illustrates experimental data collected during charge-discharge cycling experiments in anode-free cells at a charge rate of C/5 and discharge rate of C/2 correlating to the SEM images as shown in FIG. 8 for: 1) 1M LiPF$_6$ at a cell stack pressure of about 10 psi; 2) 1M LiPF$_6$ at a cell stack pressure of about 50 psi; 3) 0.6M LiDFOB+0.6M LiBF$_4$ at a cell stack pressure of about 10 psi; and 4) 0.6M LiDFOB+0.6M LiBF$_4$ at a cell stack pressure of about 100 psi. The solvent employed was a FEC:DEC 1:2 volume ratio solvent. Samples from this cycling experiment were then examined using a Phenom G2-Pro desktop SEM, with a 20 μm scale bar indicated for: 1) 1M LiPF$_6$ in FEC:DEC at a 1:2 volume ratio at a cell stack pressure of about 10 psi and about 50 psi, at 40° C., and between voltage limits of 3.6V and 4.5V after both 1 charge and after 50 cycles; and 2) 0.6M LiDFOB and 0.6 M LiBF$_4$ in FEC:DEC at a 1:2 volume ratio at a cell stack pressure of about 10 psi and 100 psi, at 40° C., and between voltage limits of 3.6V and 4.5V after both 1 charge and after 50 cycles. As shown in FIG. 8, the 0.6M LiDFOB and 0.6 M LiBF$_4$ composition showed a much lower surface area lithium deposit compared to the 1 M LiPF$_6$ composition consistent with improved capacity retention. Additionally, the lithium extracted from the cell 0.6M LiDFOB and 0.6 M LiBF$_4$ and tested at 100 psi stack pressure showed the lowest surface area of all samples examined, consistent with the best capacity retention as shown in FIG. 7. Without being bound by theory, the inventors believe that the application of stack pressure improves lithium morphology by flattening any dendritic deposits that try to form. When the inventive salt mixture and stack pressure are combined, the obtained lithium morphology is smooth and flat, showing single grains that are up to 50 micrometers in size.

Testing at 20° C.

Figure 9:
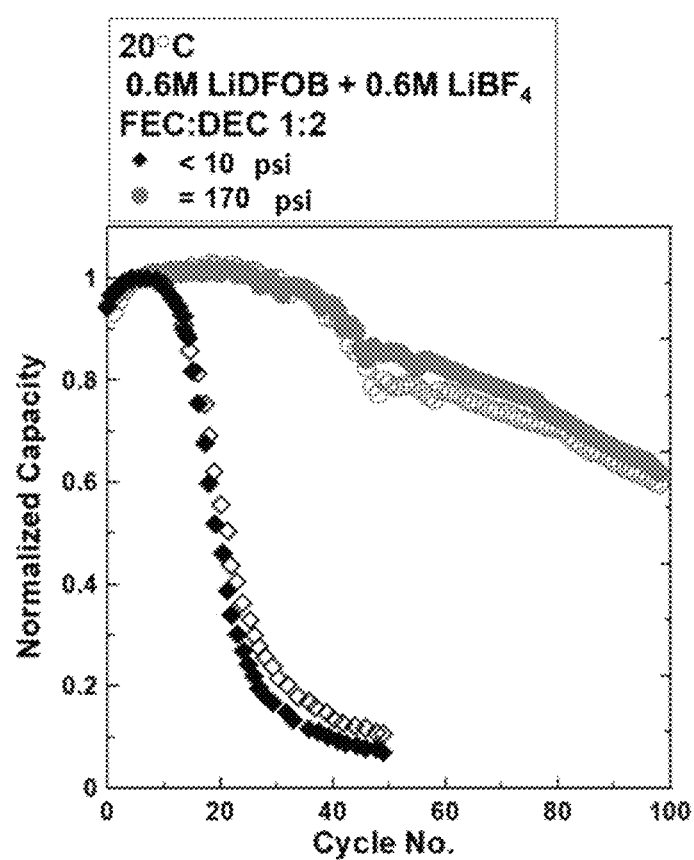
FIG. 9 illustrates experimental data collected during charge-discharge cycling experiments in anode-free pouch type cells at a charge rate of C/5 and discharge rate of C/2 at 20° C., between voltage limits of 3.6 and 4.5 V, and at an uniaxial stack pressure on the electrodes of less than 10 psi and from about 170 psi at the bottom of discharge to about 250 psi at the top of charge.

Additional testing was conducted to assess the impact of temperature on the systems. Anode free pouch cells were filled with 0.6M LiDFOB+0.6M LiBF$_4$ in FEC:DEC 1:2 electrolyte. The cells were tested at 20° C., between voltage limits of 3.6 and 4.5 V, a charge rate of C/5 and discharge rate of C/2. Two cells were tested in at an uniaxial stack pressure on the electrodes of less than 10 psi. Two other cells were tested at an uniaxial pressure on the electrode stack at about 170 psi at the bottom of discharge and about 250 psi at the top of charge. FIG. 9 shows the dramatic impact of applied pressure on cells tested at 20° C. using 0.6M LiDFOB+0.6 M LiBF$_4$ in FEC:DEC 1:2.

The foregoing disclosure is not intended to limit the present disclosure to the precise forms or particular fields of use disclosed. As such, it is contemplated that various alternative embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims. Reference to additives in the specification are generally to operative additives unless otherwise noted in the specification.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed battery system. It is to be understood that the forms of disclosure herein shown and described are to be taken as representative embodiments. Equivalent elements or materials may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Reference to "about" or "approximately" is to be construed to mean plus or minus 10%.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A method of improving capacity retention in a lithium metal or anode-free rechargeable battery cell comprising:
   providing to the battery cell a salt component consisting essentially of lithium difluoro(oxalato)borate and lithium tetrafluoroborate, and a solvent component consisting essentially of a first solvent component and a second solvent component,
   wherein the first solvent component is fluoroethylene carbonate, and the second solvent component is dimethylcarbonate or diethyl carbonate,
   wherein the molar concentration of lithium difluoro(oxalato)borate is between about 0.5M and 2M and the molar concentration of lithium tetrafluoroborate is between about 0.4M and about 2M, and
   wherein the ratio of the first solvent component to the second solvent component is between about 1:1 to about 1:2 by volume.

2. The method of claim 1, wherein an uniaxial stack pressure in the range of 20 to 500 pounds per square inch is applied to the battery cell.

3. The method of claim 2, wherein the uniaxial stack pressure is in the range of 110 to 500 per square inch.

4. The method of claim 1, wherein the second solvent component is diethyl carbonate.

5. The method of claim 4, wherein the ratio of fluoroethylene carbonate to diethyl carbonate is about 1:1 by volume.

6. The method of claim 5, wherein the molar concentration of lithium difluoro(oxalato)borate is between about 0.6M and 1M.

7. The method of claim 6, wherein the molar concentration of lithium tetrafluoroborate is between about 0.4M and 0.6M.

8. The method of claim 4, wherein the ratio of fluoroethylene carbonate to diethyl carbonate is about 1:2 by volume.

9. The method of claim 1, wherein the capacity retention of the system is improved by at least 50% compared to a system using only one of lithium difluoro(oxalato)borate and lithium tetrafluoroborate.

10. The method of claim 1, wherein the capacity retention of the system is maintained to at least 85% over 50 cycles at a charge rate of C/5 and discharge rate of C/2 at 40° C.

11. The method of claim 1, wherein the capacity retention of the system is maintained to at least 80% over 50 cycles at a charge rate of C/5 and discharge rate of C/2 at 20° C. under uniaxial stack pressure of about 150 psi.

12. The method of claim 1, wherein the second solvent component is dimethylcarbonate.

13. A rechargeable battery system including a lithium metal or anode-free battery cell comprising:
    a salt component consisting essentially of lithium difluoro(oxalato)borate and lithium tetrafluoroborate, and a solvent component consisting essentially of a first solvent component and a second solvent component,
    wherein the first solvent component is fluoroethylene carbonate, and the second solvent component is dimethylcarbonate or diethyl carbonate,
    wherein the molar concentration of lithium difluoro(oxalato)borate is between about 0.5M and 1M and the molar concentration of lithium tetrafluoroborate is between about 0.4M and about 0.6M, and
    wherein the ratio of the first solvent component to the second solvent component is between about 0.5:3 to about 3:0.5 by volume.

14. The rechargeable battery system of claim 13, wherein the second solvent component is diethyl carbonate.

15. The rechargeable battery system of claim 14, wherein the ratio of fluoroethylene carbonate to diethyl carbonate is between about 1:1 to about 1:2.

16. The rechargeable battery system of claim 13, wherein the capacity retention of the system is improved by at least 50% compared to a system using only one of lithium difluoro(oxalato)borate and lithium tetrafluoroborate.

17. The rechargeable battery system of claim 13, wherein the capacity retention of the system is maintained by at least 80% over 50 cycles at a charge rate of C/5 and discharge rate of C/2 at 20° C. when the system is subjected to a uniaxial stack pressure of about 150 psi.

18. The rechargeable battery system of claim 13, wherein the system is subjected to an uniaxial stack pressure of about 20 to about 500 psi.

19. The rechargeable battery system of claim 18, wherein the system is subjected to the uniaxial stack pressure of about 110 to about 500 psi.

20. The rechargeable battery system of claim 13, wherein the molar concentration of lithium difluoro(oxalato)borate is between about 0.6M and 1M.

21. The rechargeable battery system of claim 13, wherein the ratio of the first solvent component to the second solvent component is between about 1:1 to about 1:2.

22. The rechargeable battery system of claim 21, wherein the second solvent component is diethyl carbonate, wherein the ratio of fluoroethylene carbonate to diethyl carbonate is about 1:2 by volume.

23. The rechargeable battery system of claim 21, wherein the second solvent component is dimethylcarbonate.

24. The rechargeable battery system of claim 13, wherein the molar concentration of lithium difluoro(oxalato)borate is between about 0.6M and 1M and the molar concentration of lithium tetrafluoroborate is between about 0.4M and about 0.6M, and wherein the ratio of the first solvent component to the second solvent component is between about 1:1 to about 1:2.

25. An electrolyte composition comprising a salt component consisting essentially of lithium difluoro(oxalato)borate and lithium tetrafluoroborate, and a solvent component consisting essentially of a first solvent component and a second solvent component,
- wherein the first solvent component is fluoroethylene carbonate, and the second solvent component is dimethylcarbonate or diethyl carbonate,
- wherein the molar concentration of lithium difluoro(oxalato)borate is between about 0.5M and 1M and the molar concentration of lithium tetrafluoroborate is between about 0.4M and about 0.6M, and
- wherein the ratio of the first solvent component to the second solvent component is between about 1:1 to about 1:2 by volume.

26. The composition of claim 25, wherein the second solvent component is diethyl carbonate.

27. The composition of claim 26, wherein the molar concentration of lithium difluoro(oxalato)borate is between about 0.6M and 1M, and wherein the ratio of fluoroethylene carbonate to diethyl carbonate is about 1:2 by volume.

28. The composition of claim 25, wherein the molar concentration of lithium difluoro(oxalato)borate is between about 0.6M and 1M, wherein the second solvent component is dimethylcarbonate.

* * * * *

UNITED STATES PATENT AND TRADEMARK OFFICE
CERTIFICATE OF CORRECTION

| | | |
|---|---|---|
| PATENT NO. | : 12,388,115 B2 | Page 1 of 1 |
| APPLICATION NO. | : 16/242581 | |
| DATED | : August 12, 2025 | |
| INVENTOR(S) | : Cameron Martin et al. | |

It is certified that error appears in the above-identified patent and that said Letters Patent is hereby corrected as shown below:

In the Claims

In Column 9, Claim 3, Line 57, delete "to 500 per" and insert --to 500 pounds per--.

Signed and Sealed this
Twenty-first Day of October, 2025

John A. Squires
*Director of the United States Patent and Trademark Office*